Nov. 10, 1936.                    W. C. SANDERS                    2,060,446
                         ROLLER BEARING PEDESTAL TRUCK
                          Filed Dec. 26, 1934        2 Sheets-Sheet 1
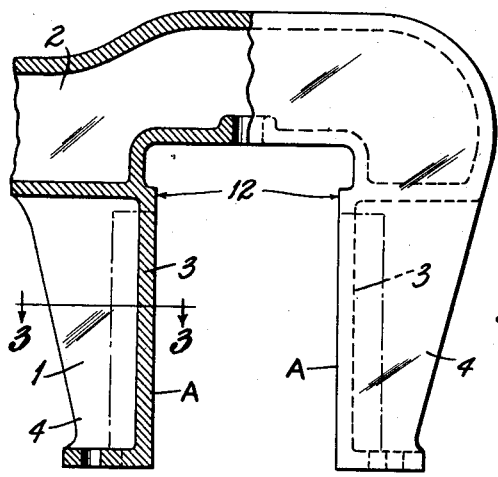
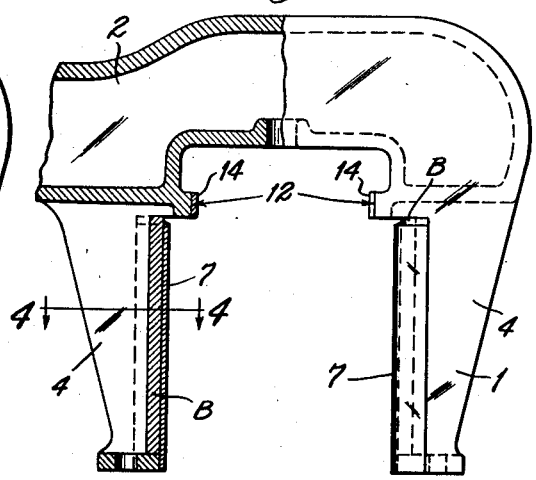
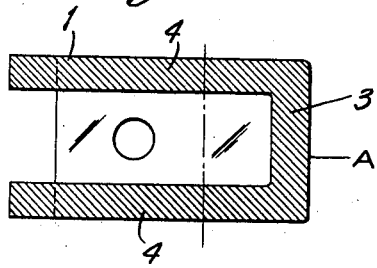
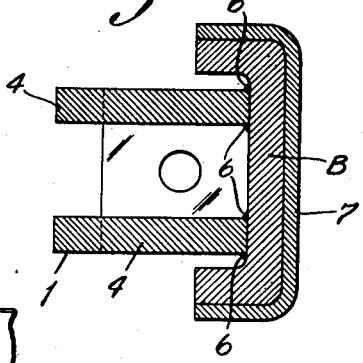
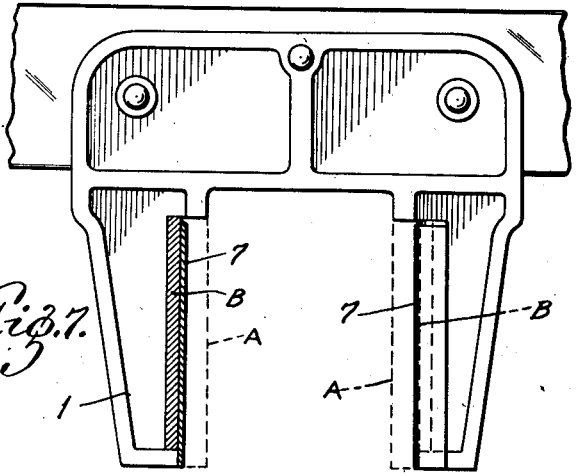
INVENTOR:
Walter C. Sanders,
by Carr Kent Gravely,
HIS ATTORNEYS.

Nov. 10, 1936. W. C. SANDERS 2,060,446
ROLLER BEARING PEDESTAL TRUCK
Filed Dec. 26, 1934 2 Sheets-Sheet 2

INVENTOR:
Walter C. Sanders,
by Cantlan & Gravely,
HIS ATTORNEYS.

Patented Nov. 10, 1936

2,060,446

UNITED STATES PATENT OFFICE 2,060,446

ROLLER BEARING PEDESTAL TRUCK

Walter C. Sanders, Canton, Ohio, assignor to The Timken Roller Bearing Company, Canton, Ohio, a corporation of Ohio Application December 26, 1934, Serial No. 759,182

3 Claims. (Cl. 105—218)

The pedestal jaws of a standard railway truck are adapted for cooperation with plain bearing boxes but are too narrow to accommodate roller bearings. It is the object of the present invention to adapt the pedestals of standard trucks to accommodate roller bearings. The invention consists principally in cutting away the guide face portions of the lower part of the pedestal horns and replacing such removed portions with guide plates welded to the pedestal horns and spaced far enough apart to receive journal bearing boxes that are adapted for use with roller bearings.

In the accompanying drawings, wherein like symbols refer to like parts wherever they occur, Fig. 1 is a view of the pedestal portion of a standard truck side frame, partly in elevation and partly in vertical section;

Fig. 2 is a similar view with portions of a pedestal horn removed and replaced with strengthening members in accordance with my invention;

Fig. 3 is a horizontal cross-section of a standard pedestal horn on the line 3—3 in Fig. 1;

Fig. 4 is a horizontal sectional view of such pedestal horn modified in accordance with my invention, the section being taken on the line 4—4 in Fig. 2;

Fig. 7 is a view partly in elevation and partly in vertical section of a separable standard pedestal modified in accordance with my invention.

Figure 5:
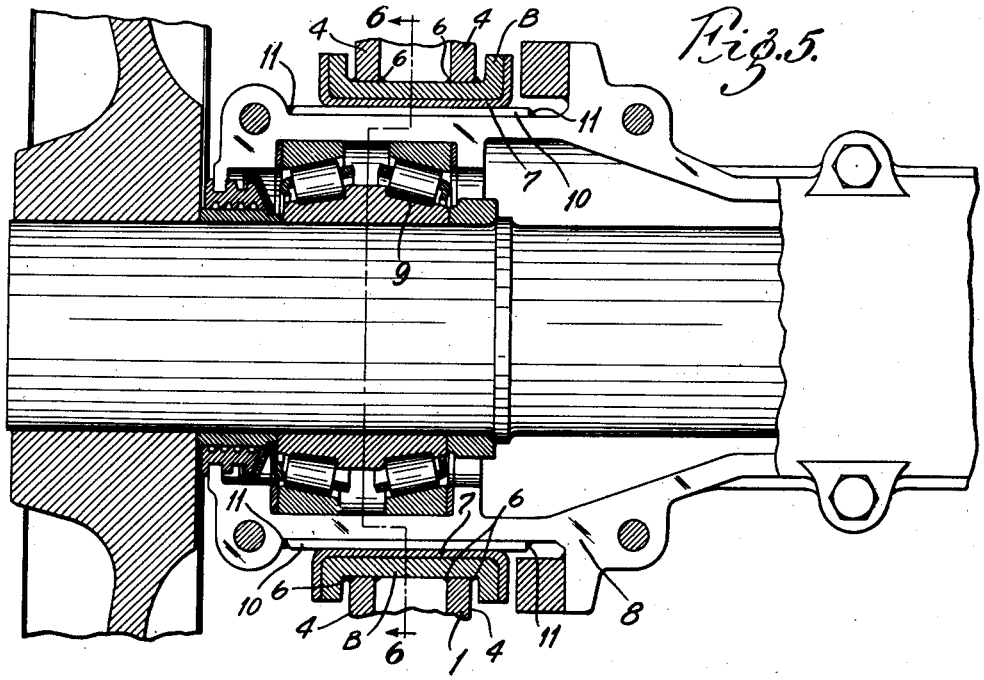
Fig. 5 is a view partly in plan and partly in horizontal section of the end portion of a roller-bearing-equipped axle mounted in my modified pedestal jaw.

The jaw or space between the horns of a standard railway truck pedestal is designed to accommodate the journal box of a plain bearing, which journal box is much smaller than is required to accommodate a roller bearing. Heretofore, when it has been desired to replace plain bearings with roller bearings, it has been necessary to use roller bearings of smaller size than desirable or to cut down the diameter of the axle to the minimum that is permissible or to slab off the sides of the bearing cups or otherwise sacrifice something in order to get within the space limitations of the standard pedestal.

According to the present invention, the jaw or distance between the horns of the pedestal is widened out by removing the lower parts of the guide face portions A of the horns of the pedestal. As the pedestal horns are weakened by the removal of the guide face portions thereof, reinforcing members B are welded to the remaining portions of the horns to restore the same to their original strength.

In a standard design, the pedestal horn 1 is of channel-shape in cross-section, as indicated in Fig. 3, and is integral with the side frame 2 of the truck. According to my invention, the entire web 3 of the channel or pedestal jaw and adjacent parts of the flanges or sides 4 thereof are cut away and replaced with a channel-shaped reinforcing member B welded to said sides, the web of the reinforcing member being wide enough to straddle the front and back side members 4 of the pedestal horn. This channel-shaped reinforcing member B is disposed with its flanges overlapping the front and back side members of the pedestal horn and with its web welded to the flange members of said horn, as indicated at 6. A suitable wear plate or liner 7 is welded or otherwise secured to the guide face of each of the reinforcing members.

The distance between the liners of the guide faces of the pedestal horns, modified as above described, is sufficient to accommodate the end of the housing 8 of a full-size roller bearing 9 together with wear plates 10 welded thereon, as indicated at 11. It is this distance that determines how far back the front and back sides of the pedestal horns shall be cut back. As stated above, it is the lower parts of the guide face portions of the pedestal horns that are cut away, the uppermost parts thereof being left intact in order not to affect the strength of the side frame. Thus, the upper part 12 of the pedestal jaw maintains its original width and, for this reason, the upper part 13 of the end of the roller bearing housing is offset inwardly to enable it, with the wear plates thereon, to fit slidably in the original jaw with its wear plates 14. Likewise, instead of making a single straight cut, it is preferable to offset the lowermost and by an amount equal to the thickness of the reinforcing plate so as to preserve more of the original bottom flange of the pedestal horn and afford a seat for the lower edge of the reinforcing member.

Figure 6:
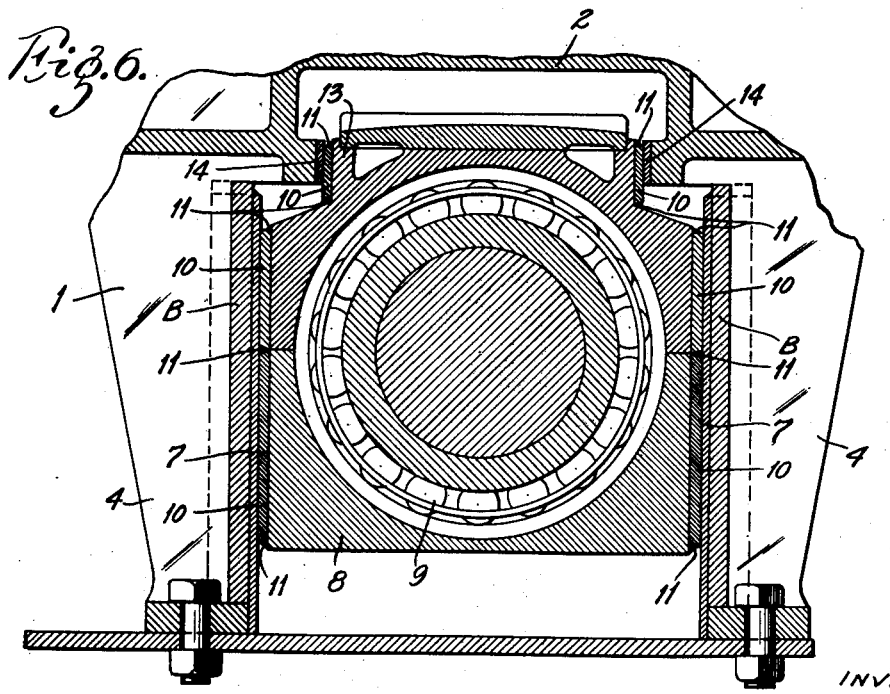
Fig. 6 is a vertical cross-sectional view on the line 6—6 of Fig. 5, showing a roller-bearing-equipped axle mounted in my modified pedestal jaw.

In consequence of the modification of the pedestal horns, as above described, it becomes feasible to equip with roller bearings standard trucks that were designed for plain bearings, as will be apparent from Fig. 6, wherein the housing of the roller bearing is much wider than the original jaw of the standard pedestal and wherein the axle and the roller bearing are of full sizes that are determined by the functions they perform and not by the dimensions of the standard truck.

What I claim is:

1. A car truck having offset pedestal horns, the distance between the upper portions of said pedestal horns being of standard dimension to recive the housing of a plain bearing and the distance between the lower portions thereof being sufficient to receive the end of a housing of a full-size roller bearing, and a roller bearing housing slidably mounted in said pedestal with its lower portions fitting btween the lower portion of the pedestal and with its upper portion offset to fit between the upper portions of said pedestal.

2. A car truck having offset pedestal horns, the distance between the upper portions of said pedestal horns being of standard dimension to receive the housing of a plain bearing and the distance between the lower portions thereof being sufficient to receive the end of a housing of a full-size roller bearing, and a roller bearing housing slidably mounted in said pedestal with its lower portion fitting between the lower portions of the pedestal and with its upper portion offset to fit between the upper portion of said pedestal, the guide face portions of the lower parts of said pedestal horns comprising channel-shaped reinforcing members welded to the body portions thereof.

3. A car truck having pedestal horns comprising side flanges whose upper portions are connected by integral guide webs that are spaced apart far enough to receive a plain bearing housing of standard width, separate guide webs connecting said flanges below said first mentioned guide webs and spaced a greater distance apart to acommodate a housing of a full size roller bearing, and a roller bearing housing slidably mounted in said pedestal with its lower portion fitting between the guide webs secured to the lower portions of said flanges and with its upper portion offset to fit between the webs integral with the upper portions of said flanges.

WALTER C. SANDERS.